May 1, 1928.

R. D. BOGUE

CANDY STICK

Filed June 17, 1926

1,668,524

INVENTOR.
Robert D. Bogue
BY
ATTORNEY.

Patented May 1, 1928.

1,668,524

UNITED STATES PATENT OFFICE.

ROBERT D. BOGUE, OF CINCINNATI, OHIO, ASSIGNOR TO THE CINCINNATI CANDY COMPANY, OF CINCINNATI, OHIO, A CORPORATION OF OHIO.

CANDY STICK.

Application filed June 17, 1926. Serial No. 116,701.

The object of my invention is to provide a simple, convenient and inexpensive stick adapted to securely hold thereon a quantity of confection and form a holder for the confection while it is being eaten.

Another object of the invention is to provide a handle having a stem adapted to receive and hold thereon a quantity of confection in such manner and shape as that the combined stick and confection will represent a miniature baseball bat.

My invention consists in providing a handle of wood, or other suitable material, in the shape of a baseball bat handle and having a stem or shank extending therefrom and adapted to be embedded in and receive thereon a quantity of molded or frozen confection whereby the complete article has the appearance of a miniature baseball bat.

My invention also consists in the construction, combination and arrangement of parts, as herein set forth and claimed.

In the drawings, which show preferred constructions:

In the embodiment of my invention as illustrated and which shows preferred constructions, I provide a handle 1 having a reduced stem 2 extending therefrom and forming a shoulder 3 adjacent the integral or connecting ends of the handle and stem. The reduced stem 2 permits the confection, such as candy, ice cream, or like product, to be molded or frozen, as the case may be, thereon, to a size shown in Figs. 1, 2 and 3, so that the inner end of the confection abuts against said shoulder and its outer surface is in alinement with the outer surface of the wooden handle whereby, when the article is completed, it affords a good representation of a miniature baseball bat, such as will be very attractive to children, as well as older persons who are interested in the game of baseball, thereby lending increased attractiveness and salability to the article.

Figure 1:
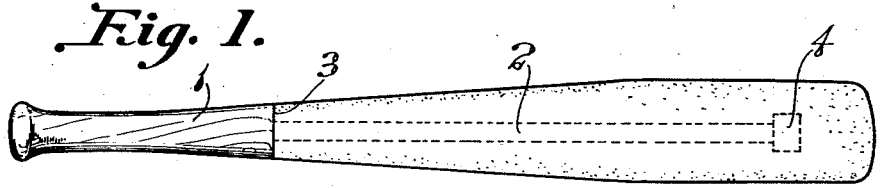
Fig. 1 is a side elevation showing the handle and confection, the stem being indicated by dotted lines.
Figure 2:
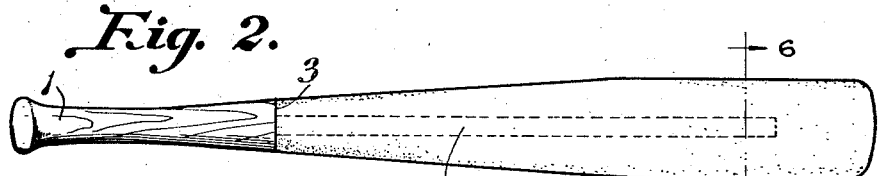
Figs. 2 and 3 are similar views representing modified constructions.
Figure 3:
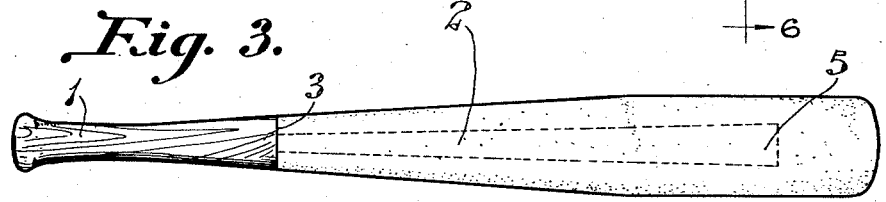
Figure 4:
Fig. 4 is a side elevation of the handle and stem.
Figure 5:
Fig. 5 is an end view of Fig. 4.
Figure 6:
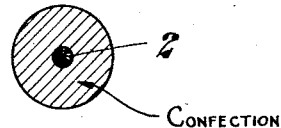
Fig. 6 is a section on the line 6—6 of Fig. 2.
Figure 7:
Fig. 7 is a perspective view showing the manner of using the candy stick.

With some forms of confection it is desirable to have the stem formed in such shape, or provided with suitable means to retain the confection from slipping off. Figs. 1 and 3 represent such construction. In Fig. 1 I provide an enlargement 4 and in Fig. 3 the stem is tapered from its end 5 to the handle 1, thereby effectually preventing the confection from sliding or slipping endwise therefrom.

While I have shown particular constructions, other modifications of my invention may be made without departing from the scope or spirit thereof, as defined in the claims.

What I claim as new and desire to secure by Letters Patent is:

1. A confection including a handle having a reduced stem connected thereto whereby a shoulder is formed adjacent the connecting ends of said handle and stem, and an edible product mounted upon said stem and having its outer surface in alinement with the outer surface of said handle whereby the entire article may represent any desired object.

2. A confection including a handle having a reduced stem connected thereto whereby a shoulder is formed adjacent the connecting ends of said handle and stem, said stem being enlarged away from said handle to form retaining means for said confection, and an edible product mounted upon said stem and having its outer surface in alinement with the outer surface of said handle whereby the entire article may represent any desired object.

ROBERT D. BOGUE.